United States Patent
Schick et al.

(10) Patent No.: US 10,040,436 B2
(45) Date of Patent: Aug. 7, 2018

(54) TRAILER BRAKE PILOT CONTROL CIRCUIT AND METHOD OF CONTROL THEREOF

(71) Applicant: Deere & Company, Moline, IL (US)

(72) Inventors: Troy E. Schick, Cedar Falls, IA (US); Ryan A. Pence, Cedar Falls, IA (US); Brandon J. McMillen, Cedar Falls, IA (US); Jordan Tagtow, Waterloo, IA (US); Aaron M. Quinn, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 69 days.

(21) Appl. No.: 15/222,066

(22) Filed: Jul. 28, 2016

(65) Prior Publication Data
US 2018/0029569 A1 Feb. 1, 2018

(51) Int. Cl.
*B60T 8/17* (2006.01)
*B60T 15/02* (2006.01)
(Continued)

(52) U.S. Cl.
CPC .......... *B60T 8/1708* (2013.01); *B60T 13/263* (2013.01); *B60T 13/581* (2013.01); *B60T 15/027* (2013.01); *B60T 15/028* (2013.01)

(58) Field of Classification Search
CPC ...... B60T 8/1708; B60T 8/1887; B60T 8/323; B60T 11/108; B60T 13/581;
(Continued)

(56) References Cited

U.S. PATENT DOCUMENTS 2,675,099 A   4/1954   Troy
6,206,481 B1 *  3/2001   Kaisers .................. B60T 8/327
                                                      303/118.1
(Continued)

FOREIGN PATENT DOCUMENTS

DE   4037462 A1   5/1992
EP   2631161 A2   8/2013
EP   2913236 A2   9/2015

OTHER PUBLICATIONS

European Patent Office; Extended European Search Report issued in EP17178849.0; dated Dec. 7, 2017; 9 pages.

*Primary Examiner* — Thomas W Irvin
(74) *Attorney, Agent, or Firm* — Taft Stettinius & Hollister LLP; Stephen F. Rost

(57) ABSTRACT

A braking system of a trailer and work machine includes a pressurized fluid supply, a hydraulic base valve fluidly coupled to the supply, and a pneumatic base valve fluidly coupled to the supply. A proportional control valve is also fluidly coupled to the supply, and it includes an outlet disposed in fluid communication with the inlets of the hydraulic base valve and the pneumatic base valve. The system further includes a hydraulic output configured to be fluidly coupled to a hydraulic braking system of a trailer, and a pneumatic output configured to be fluidly coupled to a pneumatic braking system of a trailer. The hydraulic output is fluidly coupled to the outlet of the hydraulic base valve, and the pneumatic output is fluidly coupled to the outlet of the pneumatic base valve.

20 Claims, 5 Drawing Sheets

(51) Int. Cl.
*B60T 13/26* (2006.01)
*B60T 13/58* (2006.01)

(58) Field of Classification Search
CPC .... B60T 13/263; B60T 15/027; B60T 15/028; B60T 15/041
See application file for complete search history.

(56) References Cited

U.S. PATENT DOCUMENTS

| | | | |
|---|---|---|---|
| 8,974,011 B2* | 3/2015 | Schick | B60T 8/1708 303/11 |
| 9,290,167 B2* | 3/2016 | Schick | B60T 7/042 |
| 9,327,694 B2* | 5/2016 | Klostermann | B60T 8/1708 |
| 2013/0134770 A1* | 5/2013 | Komoriya | B60T 13/683 303/20 |
| 2015/0239441 A1* | 8/2015 | Klostermann | B60T 8/1708 303/7 |
| 2015/0344011 A1* | 12/2015 | Casali | B60T 7/04 303/7 |
| 2017/0015289 A1* | 1/2017 | Schick | B60T 7/042 |
| 2017/0197603 A1* | 7/2017 | Minato | B60T 15/041 |
| 2018/0029570 A1* | 2/2018 | Schick | B60T 8/1708 |
| 2018/0029571 A1* | 2/2018 | Schick | B60T 8/1708 |
| 2018/0029572 A1* | 2/2018 | Schick | B60T 8/1708 |

* cited by examiner

TRAILER BRAKE PILOT CONTROL CIRCUIT AND METHOD OF CONTROL THEREOF

FIELD OF THE DISCLOSURE

The present disclosure relates to a fluid control circuit, and in particular, to a trailer brake pilot control circuit of a trailer and work machine.

BACKGROUND OF THE DISCLOSURE

Tractor trailer combinations generally require a braking system on the trailer that is engaged when a braking system of the tractor is selectively engaged. Often the braking system of the trailer is coupled to the braking system of the tractor to allow the tractor to simultaneously apply the braking system of the tractor and the trailer. Trailer brake systems often include a hydraulic component and a pneumatic component. The pneumatic component of the system may be modulated by an operator, but the hydraulic component is not.

SUMMARY

In one embodiment of the present disclosure, a braking system of a trailer and work machine includes a pressurized fluid supply; a hydraulic base valve fluidly coupled to the supply, the hydraulic base valve including an inlet and an outlet; a pneumatic base valve fluidly coupled to the supply, the pneumatic base valve including an inlet and an outlet; a proportional control valve fluidly coupled to the supply, the proportional control valve including an outlet disposed in fluid communication with the inlets of the hydraulic base valve and the pneumatic base valve; a hydraulic output configured to be fluidly coupled to a hydraulic braking system of a trailer, the hydraulic output fluidly coupled to the outlet of the hydraulic base valve; and a pneumatic output configured to be fluidly coupled to a pneumatic braking system of a trailer, the pneumatic output fluidly coupled to the outlet of the pneumatic base valve.

In one example of this embodiment, the braking system may include a solenoid valve disposed in fluid communication with the proportional control valve, where the solenoid valve is movable between an open position in which the proportional control valve is fluidly coupled to the hydraulic base valve and pneumatic base valve, and a closed position in which the proportional control valve is not fluidly coupled to the hydraulic base valve and pneumatic base valve. In a second example, the braking system may include a controller; and a solenoid of the solenoid valve disposed in electrical communication with the controller, where movement of the solenoid valve between its open and closed positions is operably controlled by the controller. In a third example, the braking system may include a controller; a service brake valve configured to provide fluid upon actuation of a service brake of the work machine; a sensor disposed in electrical communication with the controller, the sensor configured to detect a brake pressure from the service brake valve; wherein, the controller determines a brake command as a function of the brake pressure, and operably controls the proportional control valve based on the brake command.

In a fourth example, the controller receives a pre-brake command and operably controls an output of the proportional control valve as a function of the brake pressure and pre-brake command. In a fifth example, the braking system may include a shuttle valve movably actuated between a first position and a second position, the shuttle valve being fluidly coupled between the proportional control valve and the service brake valve; wherein, the shuttle valve is disposed in the first position when the brake pressure from the service brake valve is greater than an output pressure from the proportional control valve, and the shuttle valve is disposed in the second position when the brake pressure from the service brake valve is less than an output pressure from the proportional control valve. In a further example, the braking system may be configured such that in the first position, the service brake valve is directly fluidly coupled with the hydraulic and pneumatic base valves, and the shuttle valve blocks fluid communication between the proportional control valve and the hydraulic and pneumatic base valves; and in the second position, the proportional control valve is directly fluidly coupled with the hydraulic and pneumatic base valves, and the shuttle valve blocks fluid communication between the service brake valve and the hydraulic and pneumatic base valves.

In another embodiment of this disclosure, a method of controlling pressurized fluid to a trailer brake system includes providing a controller, a hydraulic fluid supply, a pneumatic fluid supply, a work machine brake system, a hydraulic brake output, a pneumatic brake output, a hydraulic base valve fluidly coupled to the hydraulic brake output, a pneumatic base valve fluidly coupled to the pneumatic brake output, a proportional control valve fluidly coupled to the hydraulic fluid supply, a solenoid valve, and a shuttle valve; detecting a brake pressure in the work machine brake system with a sensor; communicating the brake pressure to the controller via the sensor; identifying, with the controller, a pre-brake command for the proportional control valve; determining a brake command by the controller as a function of the brake pressure and the pre-brake command; controlling an output pressure of the proportional control valve with the controller as a function of the brake command; and outputting pilot pressure to the hydraulic base valve and the pneumatic base valve based on the greater of the output pressure of the proportional control valve and the brake pressure of the work machine brake system.

In one example of this embodiment, the method may include providing a first brake and a second brake of the work machine brake system, the first brake generating a first brake pressure and the second brake generating a second brake pressure; fluidly coupling a first sensor to the first brake for detecting the first brake pressure and a second sensor to the second brake for detecting the second brake pressure, wherein the first sensor and the second sensor are electrically coupled to the controller; wherein, the determining step comprises calculating the brake command as a function of the first brake pressure, the second brake pressure, and the pre-brake command.

In a second example, the determining step may include multiplying the pre-brake command by an average of the first and second brake pressures. In a third example, the determining step may include multiplying the pre-brake command by either the higher or lower of the first and second brake pressures. In a fourth example, the controlling step may include calculating the brake command as a function of the first brake pressure, the second brake pressure, and the pre-brake command; comparing the brake command to the pre-brake command; and outputting a current to the proportional control valve based on the greater of the brake command and the pre-brake command. In a fifth example, the outputting step may include actuating the shuttle valve to a first position or a second position based on the greater of the output pressure of the proportional control valve and the brake pressure of the work machine brake system.

In another example, the controlling step may include determining an amount of current in proportion to the detected brake pressure; and sending the amount of current by the controller to the proportional control valve; wherein, the amount of current is adjustable based on the pre-brake command. In a further example, the method may include adjustably controlling the pre-brake command for the proportional control valve. In yet a further example, the method may include fluidly coupling the solenoid valve between the proportional control valve and the shuttle valve; electrically coupling a solenoid of the solenoid valve with the controller; and operably controlling movement of the solenoid valve between an open position and a closed position, wherein in the open position the output pressure of the proportional control valve is fluidly coupled to the shuttle valve, and in the closed position the output pressure of the proportional control valve is not fluidly coupled to the shuttle valve. In yet another example, in the closed position the service brake valve is directly fluidly coupled to the hydraulic base valve and the pneumatic base valve.

In a further embodiment of this disclosure, a braking system of a tractor trailer combination includes a controller; a pressurized fluid supply; a first brake and a second brake of the tractor, the first brake providing a first brake pressure and the second brake providing a second brake pressure; a first shuttle valve disposed in fluid communication with the first brake pressure and the second brake pressure; a hydraulic base valve fluidly coupled to the supply, the hydraulic base valve including an inlet and an outlet, where the inlet is fluidly coupled to the first shuttle valve; a pneumatic base valve fluidly coupled to the supply, the pneumatic base valve including an inlet and an outlet, where the inlet of the pneumatic base valve is fluidly coupled to the inlet of the hydraulic base valve; a proportional control valve fluidly coupled to the supply; a second shuttle valve fluidly coupled between the proportional control valve and the first shuttle valve; a hydraulic output fluidly coupled to the outlet of the hydraulic base valve and configured to be fluidly coupled to a hydraulic braking system of a trailer; and a pneumatic output fluidly coupled to the outlet of the pneumatic base valve and configured to be fluidly coupled to a pneumatic braking system of a trailer; wherein, the controller operably controls an output pressure of the proportional control valve as a function of an adjustable brake command; further wherein, a pilot pressure is fluidly communicated to the hydraulic base valve and the pneumatic base valve, where the pilot pressure is a function of the first brake pressure, the second brake pressure, and the output pressure.

In one example of this embodiment, the system may include a solenoid valve disposed in fluid communication between the proportional control valve and the second shuttle valve, where the solenoid valve is movable between an open position in which the proportional control valve is fluidly coupled to the second shuttle valve, and a closed position in which the proportional control valve is not fluidly coupled to the second shuttle valve. In another example, the system may include an operator display for communicating a pre-brake command to the controller; wherein, the brake command is determined by the controller as a function of the pre-brake command, the first brake pressure, and the second brake pressure; further wherein, the output pressure of the proportional control valve is a function of current provided by the controller to the proportional control valve as a function of the brake command.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
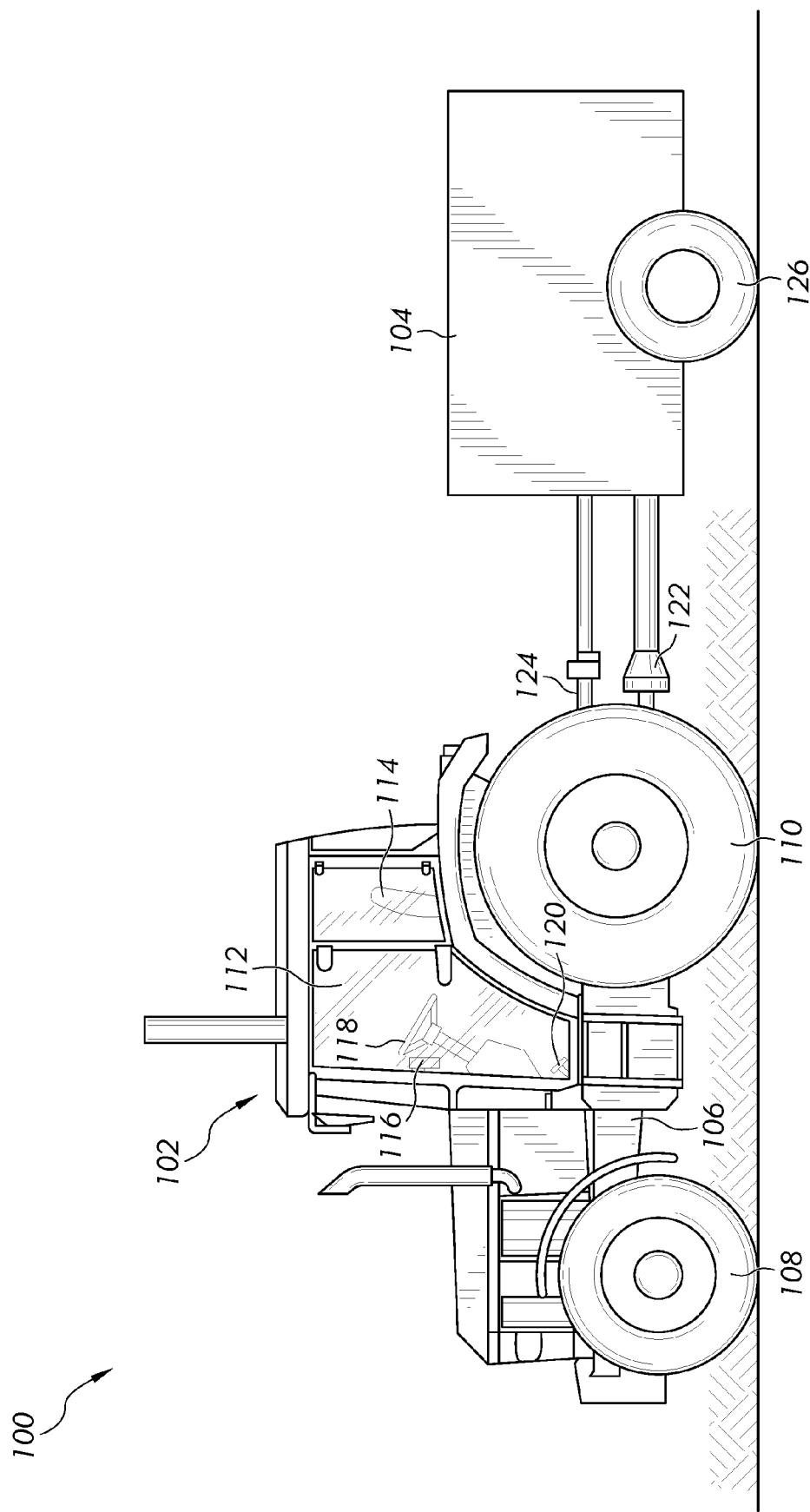
FIG. 1 is a side view of a combined tractor and trailer system.

Referring to FIG. 1, a combined tractor trailer system 100 is shown. In this system, a tractor 102 is shown coupled to and pulling a trailer 104. The tractor 102 may have a chassis 106 that spans between a front ground engaging mechanisms 108 and a rear ground engaging mechanisms 110. In the embodiment of FIG. 1, each ground-engaging mechanism is in the form of a wheel defined along a respective axle, i.e., a front axle and a rear axle. In other embodiments, however, the ground-engaging mechanism may be a track that propels the tractor 102 along a ground surface. Likewise, the trailer 104 may also include at least one ground-engaging mechanism such as a wheel 126.

A cab 112 may be coupled to the chassis 106 and define a location for an operator to be positioned in an operator's seat 114. From the cab, the operator may control the tractor 102 and trailer 104 via a plurality of controls. As shown, the cab 112 may include a display 116 or dashboard that visually shows control characteristics of the tractor 102 or trailer 104 such as speed, power, temperature, pressure, direction, and any other type of control characteristic. The display 116 may be a touchscreen display that includes one or more operator controls for selectively controlling the operation of the tractor 102 or trailer 104. Other controls may include a steering wheel or yoke 118, a pedal 120 (e.g., a brake pedal, clutch pedal, or throttle pedal), any other type of control such as a joystick, switch, lever, knob, etc. for controlling the tractor trailer system 100.

While a tractor 102 is shown and described herein, any type of work machine may utilize the teachings of this disclosure and therefore it is not intended to be limited to applying to only tractors. In other embodiments, a truck configured to tow a trailer may utilize the teachings of this disclosure. Accordingly, the tractor 102 can be any type of work machine used to pull a trailer.

The tractor 102 may be coupled to the trailer 104 through a hitch member or drawbar 122. The hitch member or drawbar 122 may be sufficiently strong to transfer motion of the tractor 102 to the trailer 104. In one embodiment, when the tractor 102 travels in a forward direction, the hitch member 122 pulls the trailer 104 along therewith in approximately the same direction.

One or more fluid lines 124 may also be provided. For purposes of this disclosure, a fluid may include a gas or liquid. Thus, any pneumatic or hydraulic line may be referred to as a fluid line herein. The one or more fluid lines 124 may selectively fluidly couple a tractor brake system to a trailer brake system. More specifically, the tractor 102 may provide a trailer brake output that is coupled to the trailer brake system. In this configuration, when the user initiates a brake command, both the tractor brake system and the trailer brake system may simultaneously engage to slow the tractor 102 and trailer 104.

In some tractor trailer systems, one or more brake pedals may be engaged by an operator to apply a tractor service brake. Brake actuators may be pressurized to apply the brakes, which will be described in greater detail below with reference to FIG. 2. Once the operator commands engagement of the tractor braking system, the trailer braking system also engages to prevent the trailer from contacting or running into a back end of the tractor. In many conventional braking systems, there may be a single hydraulic line that connects between the tractor and trailer braking systems. In addition, a single hydraulic trailer brake valve may have a fixed gain associated with it due to its geometry. Thus, depending upon the fixed gain, an amount of pressure entering the valve is multiplied by the fixed gain to deliver a predetermined outlet pressure. As braking systems change and new federal and international guidelines or standards change, there is a need for both lower and higher outlet pressures depending upon the type of trailer. As a result, an adjustable gain across the hydraulic trailer brake valve is desirable over a fixed gain. Other needs and advantages will become apparent from the principles and teachings of the present disclosure.

Figure 2:
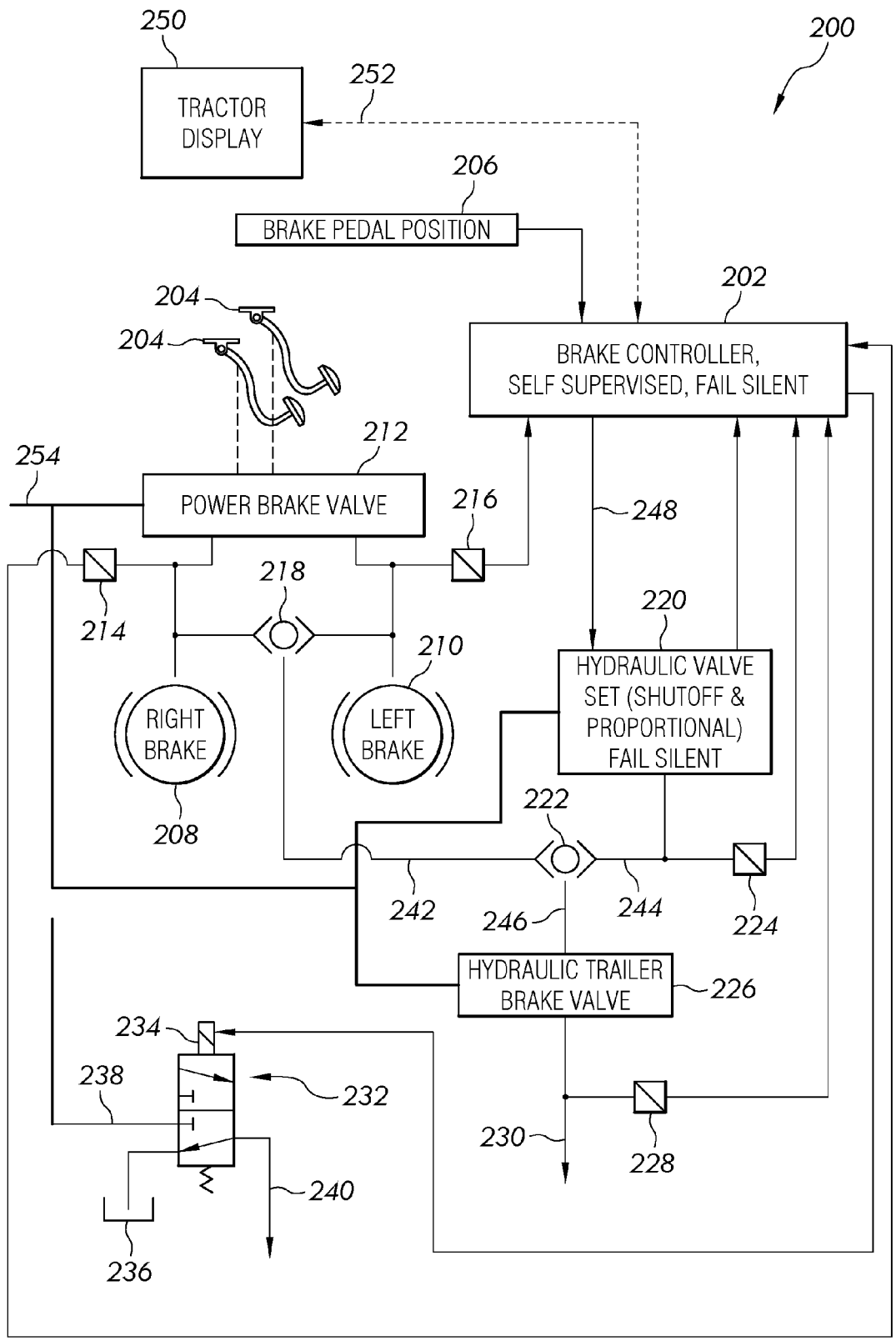
FIG. 2 is a control schematic view of a hydraulic system of a combined tractor and trailer brake system.

In some tractor trailer systems, the trailer braking system includes a hydraulic braking system, a pneumatic braking system, or a combination thereof. An example of a hydraulic trailer brake system is shown in FIG. 2. In this embodiment, a hydraulic braking system 200 of a tractor and a trailer may include a brake controller 202 as shown. The brake controller 202 may be in electrical communication with a vehicle controller (not shown), an engine controller (not shown), a transmission controller (not shown), and any other type of controller for controlling the tractor or trailer. The brake controller 202 may include a plurality of inputs and outputs for receiving and communicating electrical signals or commands to different components within the braking system 200. In FIG. 2, for example, the brake controller 202 may be disposed in electrical communication with a tractor display 250. This communication may exist over a controller area network (CAN) bus 252 or communication link. The display 250 may allow an operator to selectively communicate instructions to the brake controller 202 for controlling the tractor braking system or the trailer braking system 200.

Other operator controls may also be in communication with the brake controller 202. For example, one or more brake pedals 204 may be selectively engaged by an operator. A brake position sensor 206 may detect a movement of the one or more brake pedals 204 and communicate this movement to the brake controller 202. Upon application of the one or more brake pedals 204, a brake valve 212 may be triggered such that fluid from a hydraulic supply line 254 (via a pump or other pressure source) is delivered to brake actuators. In turn, the brake actuators are controllably actuated to deliver hydraulic brake pressure to the tractor braking system to control the speed of the tractor. In FIG. 2, the braking system 200 illustrates a right brake actuator 208 and a left brake actuator 210. In this embodiment therefore the operator may depress a right brake pedal and a left brake pedal to engage the tractor braking system. The right brake pedal and right brake actuator 208 may control brake pressure to a service brake on the right, rear wheel of the tractor, and the left brake pedal and left brake actuator 210 may control brake pressure to a service brake on the left, rear wheel of the tractor. In doing so, the right brake actuator 208 and left brake actuator 210 deliver hydraulic pressure to the tractor service brakes to slow the vehicle. This hydraulic pressure may also be delivered to the trailer braking system as will be described below.

As is known, an operator may apply the brake pedals to brake the tractor and slow its speed. In addition, an operator may gently apply or tap on the brake pedal, as is often the case with an operator desiring to disable cruise control in a motor vehicle. In the tractor trailer system, it may be desirable to begin braking the trailer as soon as the brake controller 202 detects engagement of the one or more brake pedals 204. In this example, the brake controller 202 may execute a pre-brake routine or algorithm to begin applying the trailer braking system. In the embodiment of FIG. 2, the brake pedal position sensor 206 can send a signal to the brake controller 202 indicating that the operator has begun to depress the pedals 204. Before any brake pressure or a substantial amount of brake pressure is generated, the brake controller 202 may execute the pre-brake routine and send a signal to the trailer braking system to begin braking the trailer. This signal may be an adjustable or proportional signal from the brake controller 202. The signal may be received by a trailer brake valve that includes a first solenoid valve and a second 2-way position valve (i.e., an on/off valve). In one example, up to seven bars of pressure may be output from the valve to the trailer brakes to begin a braking operation.

During this pre-brake routine, the first solenoid valve may receive the signal from the brake controller and deliver the hydraulic pressure to the trailer brakes. The second, 2-way position valve may be disposed in its open position to allow fluid pressure to pass through. However, if there is a failure detected in the system, the second, 2-way position valve can be actuated to its off or closed position to block fluid pressure to the trailer brake system. This "fail-silent" condition may be utilized to protect against possible failures in the system. In any event, hydraulic pressure may still pass through a main hydraulic trailer brake valve 226 (FIG. 2) so that the trailer braking system is engaged during a braking operation. The pre-brake valve set, however, may be disabled or closed so that no output pressure passes through the valve set to the trailer brakes.

In FIG. 2, hydraulic brake pressure from the right brake actuator 208 may be detected by a first pressure transducer 214, and from the left brake actuator 210 may be detected by a second pressure transducer 216. The first and second transducers may be in electrical communication with the brake controller 202. This electrical communication may be either wired or wireless communication, or any other known or to be developed form of communication. As a result, the brake controller 202 can monitor brake pressure from both actuators.

A shuttle valve 218 may be disposed in fluid communication with the right brake actuator 208 and the left brake actuator 210. The shuttle valve 218 may be actuated in either direction depending upon which brake pressure is the greatest. As such, the greater of the two brake pressures passes through the shuttle valve 218 and is referred to as brake pilot pressure. In FIG. 2, the brake pilot pressure flows downstream from the shuttle valve 218 along a brake pilot line 242.

The braking system 200 of FIG. 2 may also include a hydraulic valve set 220. This valve set 220 may be similar to the aforementioned pre-brake valve set in that it includes both a proportional solenoid valve and a 2-way shutoff valve. As shown, the brake controller 202 may be in electrical communication with the hydraulic valve set 220 to control its operation. For example, a trailer brake command 248 may be communicated from the brake controller 202 to the valve set 220. Moreover, the valve set 220 may send signals to the brake controller 202 in response to its operation (i.e., a pressure transducer 224 may communicate a pressure associated with the valve set to the controller 202).

Outlet pressure from the hydraulic valve set 220 may flow through a fluid line 244 as shown in FIG. 2. The hydraulic valve set fluid line 244 and the brake pilot line 242 may converge upon a second shuttle valve 222. Similar to the operation of the first shuttle valve 218, the greater of the brake pilot pressure and hydraulic valve set pressure may pass through the second shuttle valve 222 and enter hydraulic line 246. The pressure in hydraulic line 246 may be referred to as the hydraulic pilot pressure. A pressure transducer 228 can detect the hydraulic pilot pressure and communicate this pressure to the brake controller 202, as shown in FIG. 2. This hydraulic pilot pressure may pass through a hydraulic trailer brake control line 230 to the trailer brakes.

In the system 200 of FIG. 2, the trailer may also include a trailer park brake. The trailer park brake may be operably controlled via a hydraulic trailer park control valve 232. This valve 232 may include a solenoid 234 that is in electrical communication with the brake controller 202. The hydraulic trailer park control valve 232 may be biased to its vented position to allow pressure to flow through a supplementary hydraulic line 240. The valve 232 may also be in fluid communication with a tank or reservoir 236 as shown. As such, hydraulic pressure may be delivered from a supply line 238 to the hydraulic trailer park control valve 232, and in its normally or biased open position, pressure passes therethrough to the hydraulic trailer brake supplementary line 240.

Figure 3:
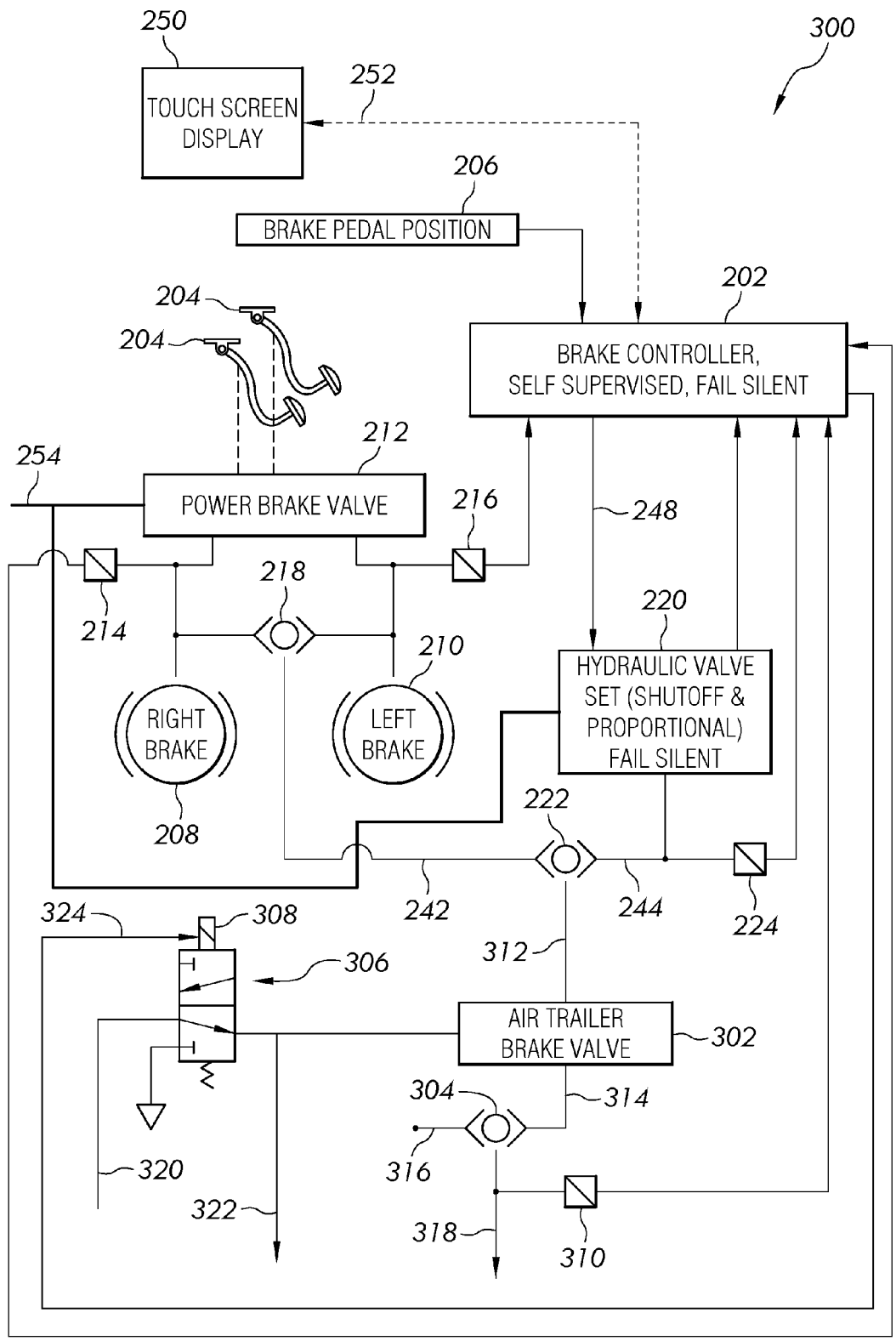
FIG. 3 is a control schematic view of a combined hydraulic and pneumatic system of a combined tractor and trailer brake system.

Referring to FIG. 3, a portion of the braking system 200 of FIG. 2 is removed and an air or pneumatic trailer braking system 300 is shown. As described above, the trailer braking system may be hydraulic, pneumatic, or a combination thereof. In this disclosure, the pneumatic trailer braking system may use any form of gas for controlling its brakes. However, for sake of simplicity, the type of gas will be referred to as air through the remainder of this disclosure. Thus, the pneumatic trailer braking system 300 will be referred to as the air trailer braking system 300, but it is to be understood that any type of gas may be used to control the trailer brakes.

In FIG. 3, the air trailer braking system 300 may include an air or pneumatic trailer brake valve 302. The air trailer brake valve 302 may be located downstream from the second shuttle valve 222 of the hydraulic system 200 such that hydraulic pressure is used as an inlet to control the valve 302. Hydraulic pressure may flow through a pilot pressure line 312 to an inlet of the air trailer brake valve 302.

In addition to the air trailer brake valve 302, the air trailer braking system 300 may also include an air supply line 320, a shuttle valve 304, an air trailer park brake control valve (not shown), and a leak detect valve 306. The shuttle valve 304 is disposed downstream of the air trailer brake valve 302 and the air trailer park brake control valve. Thus, air pressure may be output from the air trailer brake valve 302 via a first pressure line 314 and from the air trailer park brake control valve via a second pressure line 316. The greater of the two pressures from the first and second line may trigger the shuttle valve 304 open so that air pressure can flow through a first air trailer brake control line 318 to the air trailer brakes. A pressure transducer 310 may be in fluid communication with the control line 318 to detect the pressure and communicate it to the brake controller 202.

The leak detect valve 306 may be in the form of a normally open solenoid control valve. The valve 306 may include a solenoid 308 that is disposed in electrical communication with the brake controller 202. As such, the brake controller 202 can control the leak detect valve 306 between its open and closed positions via a communication link 324 with the solenoid 308.

Air pressure may be supplied via the supply line 320 to the leak detect valve 306. Since the leak detect valve 306 may be biased to its open position, fluid may flow through the valve 306 to the air trailer brake valve 302 and to an air trailer brake supply line 322.

The embodiments of FIGS. 2 and 3 are illustrative of only one example of a braking system for a tractor trailer combination. Other embodiments of a braking system is possible and within the scope of this disclosure. For instance, another embodiment may include one or more electrohydraulic secondary brake valves.

Figure 4:
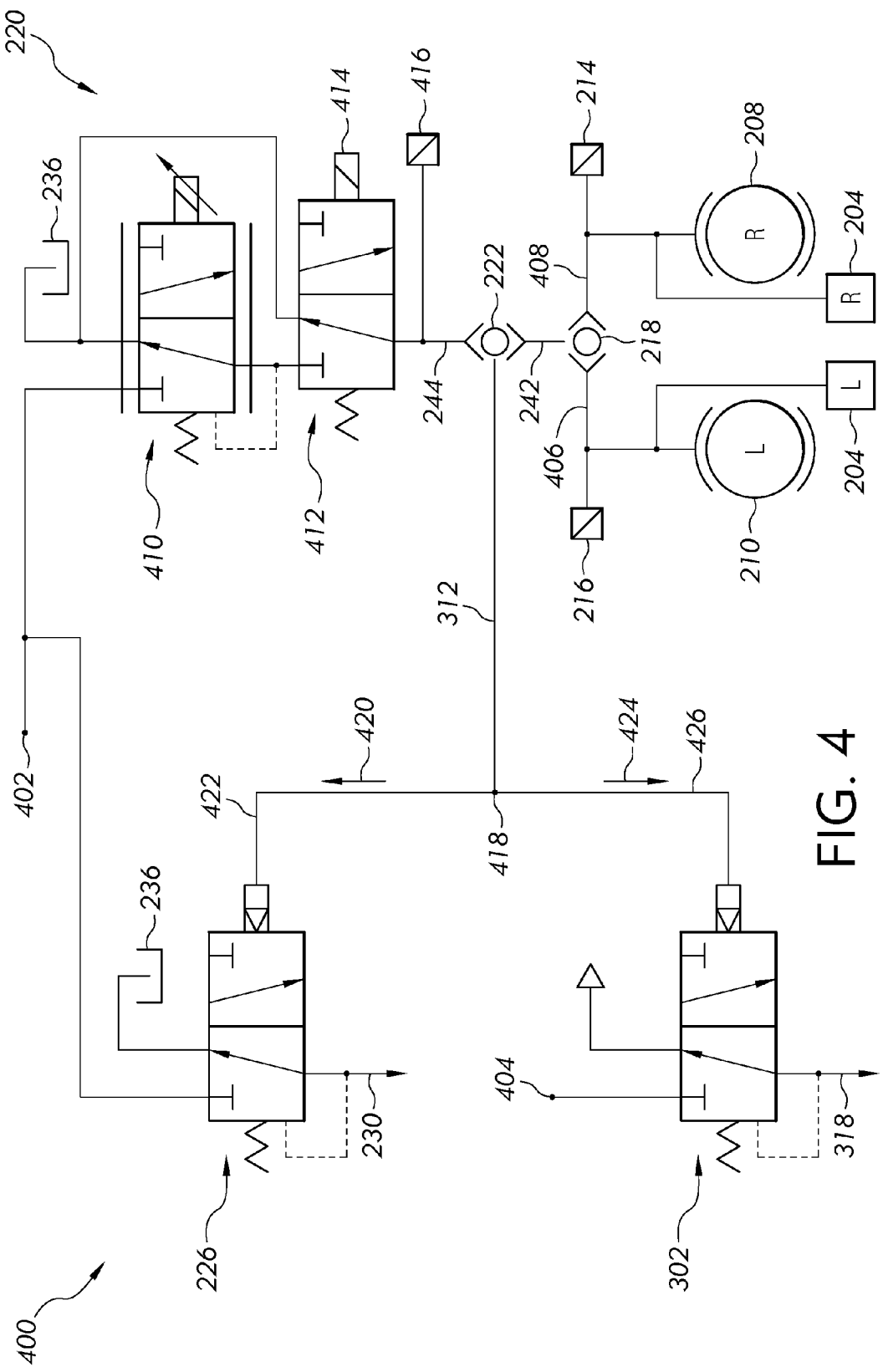
FIG. 4 is a schematic of a trailer brake control circuit.

Referring to FIG. 4, a trailer brake control system or circuit 400 is shown. A conventional trailer towed by a work machine such as a tractor may have varying levels of braking performance. For a proper tractor-trailer transport braking control, it can be useful to adjustably modulate the tractor trailer brake pressure. This can be done by an operator of the work machine. Under new government regulations in Europe, adjustable trailer brake performance is necessary.

In a conventional agriculture machine such as a tractor trailer combination, an electrohydraulic pressure control valve set may be used to adjust the performance of pneumatic trailer brakes. However, in these conventional control systems, the performance of hydraulic trailer brakes are not adjustable by the operator. Thus, the system 400 in FIG. 4 is designed to control hydraulic trailer brake performance using the electrohydraulic pressure control valve set. In this manner, a hydraulic circuit may be used to simultaneously control the pilot pressure signal to both a hydraulic trailer brake valve and a pneumatic trailer brake valve so that both hydraulic and pneumatic trailer brake performance may be adjusted by an operator.

Referring to the embodiment of FIG. 4, the control system 400 includes a hydraulic trailer brake valve 226 and a pneumatic trailer brake valve 302, as described above in FIGS. 2 and 3. The system 400 includes a supply of hydraulic fluid 402 and a supply of pneumatic fluid 404, such as air. The work machine or tractor (not shown) may include a brake system with a left service brake and a right service brake 204. The left service brake may control a left rear axle of the machine, and the right service brake may control a right rear axle of the machine. During machine operation, the operator may apply the service brakes 204 to hydraulic control braking of the tractor or work machine. The left hydraulic actuator 210 and the right hydraulic actuator 208 may provide hydraulic fluid into a left pressure brake line 406 and a right pressure brake line 408, respectively. A first pressure sensor 214 can measure or detect the pressure in the right pressure brake line 408, and a second pressure sensor 216 can measure or detect the pressure in the left pressure brake line 406. Each of the first and second sensors may be disposed in electrical communication with the brake controller 202 to communicate the pressures in each line.

As pressure builds in each pressure line, a first shuttle valve 218 can control the amount of pressure in a brake pilot pressure line 242 based on the higher of the two brake pressures. Thus, if the pressure in the left pressure brake line 406 is greater than the pressure in the right pressure brake line 408, then the first shuttle valve 218 will actuate to allow the pressure in the left pressure brake line 406 to flow through and into the brake pilot pressure line 242. The same is true if the pressures are reverse.

The system 400 of FIG. 4 may also include an electrohydraulic valve set similar to the hydraulic valve set 220 of FIG. 2. Here, the hydraulic valve set 220 may include a first valve and a second valve. The first valve may be a pressure-controlled, proportional solenoid valve 410 that may be adjustably controlled to produce a variable outlet pressure. This valve may outlet between 0-35 bar of hydraulic pressure, although other embodiments may vary in the amount of outlet pressure from the valve. The brake controller 202, for example, may send a current to the control valve 410 to produce a desired pressure. The gain across the valve set 220 may be operator controlled via the display 250, as described above. For instance, the operator may set the gain to a defined value using the display 250, and this gain may be communicated to the brake controller 202. This gain may be stored by the controller 202 in a memory unit thereof. Moreover, the operator may adjust the gain as desired. For example, if the operator disconnects a newer trailer and connects an older trailer to the tractor, the operator may adjust the gain accordingly.

The second valve may be a multi-position valve, e.g., a two-way or three-way, on/off solenoid valve 412. The solenoid valve 412 may include a solenoid 414 that is in electrical communication with the brake controller 202. The valve 412 may be biased in its open position to allow fluid to flow through the valve set 220, but if an issue arises similar to the "fail-safe" description above, the multi-position valve 412 may be triggered via the brake controller 202 to its closed position and vent pressure to tank 236. In doing so, the solenoid valve 412 blocks flow through the valve set 220.

As also shown in FIG. 4, a pressure transducer or sensor 416 may be positioned downstream from the valve set 220 to measure outlet pressure in an electrohydraulic brake pilot line 244. This transducer or sensor 416 may correspond with transducer 224 of FIG. 2, which is in electrical communication with the brake controller 202 to continuously communicate the outlet pressure to the controller 202.

The system 400 may also include a second shuttle valve 222 as shown in FIG. 4. The second shuttle valve 222 may be fluidly coupled between the brake pilot pressure line 242 and the electrohydraulic brake pilot line 244. The pressure in the brake pilot pressure line 242 may be a fixed pressure from the service brakes, and the pressure in the electrohydraulic brake pilot line 244 may be adjustable via the electrohydraulic valve set 220. Similar to the first shuttle valve 218, the second shuttle valve 222 may be actuated in one direction or the other based on the higher pressure in the brake pilot pressure line 242 and the electrohydraulic valve set 220. Whichever is the higher pressure will flow through the shuttle valve 222 and into the hydraulic pilot pressure line 312.

Hydraulic pressure in the hydraulic pilot pressure line 312 may feed to both the hydraulic trailer brake valve 226 and the pneumatic trailer brake valve 302, as shown in FIG. 4. Thus, both circuits may be adjustably controlled via the electrohydraulic valve set 220, and both control circuits (i.e., the hydraulic circuit and pneumatic circuit) may be hydraulically controlled via the same pilot pressure. In other words, in this embodiment, the pneumatic control circuit uses hydraulic pilot pressure similar to the hydraulic circuit for actuating the pneumatic brakes on the trailer. In doing so, the pilot pressure may be a command to the pneumatic trailer brake valve 302 to control pneumatic pressure to the trailer brakes via a pneumatic control coupler or control line (e.g., the first control line 318 in FIG. 3).

The pilot pressure flowing through the hydraulic pilot pressure line 312 may flow through a junction 418 in which a first portion flows in a first direction 420 to the hydraulic trailer brake valve 226 via a first hydraulic line 422, and a second portion flows in a second direction 424 to the pneumatic trailer brake valve 302 via a second hydraulic line 426. As described with respect to FIGS. 2 and 3, hydraulic pressure may flow through the hydraulic trailer brake valve 226 to a hydraulic trailer brake control line 230 for actuating hydraulic brakes on the trailer. Moreover, hydraulic pressure may operably control the pneumatic trailer brake valve 302 to output pneumatic pressure to the first pneumatic control line 318 for actuating pneumatic brakes on the trailer.

Figure 5:
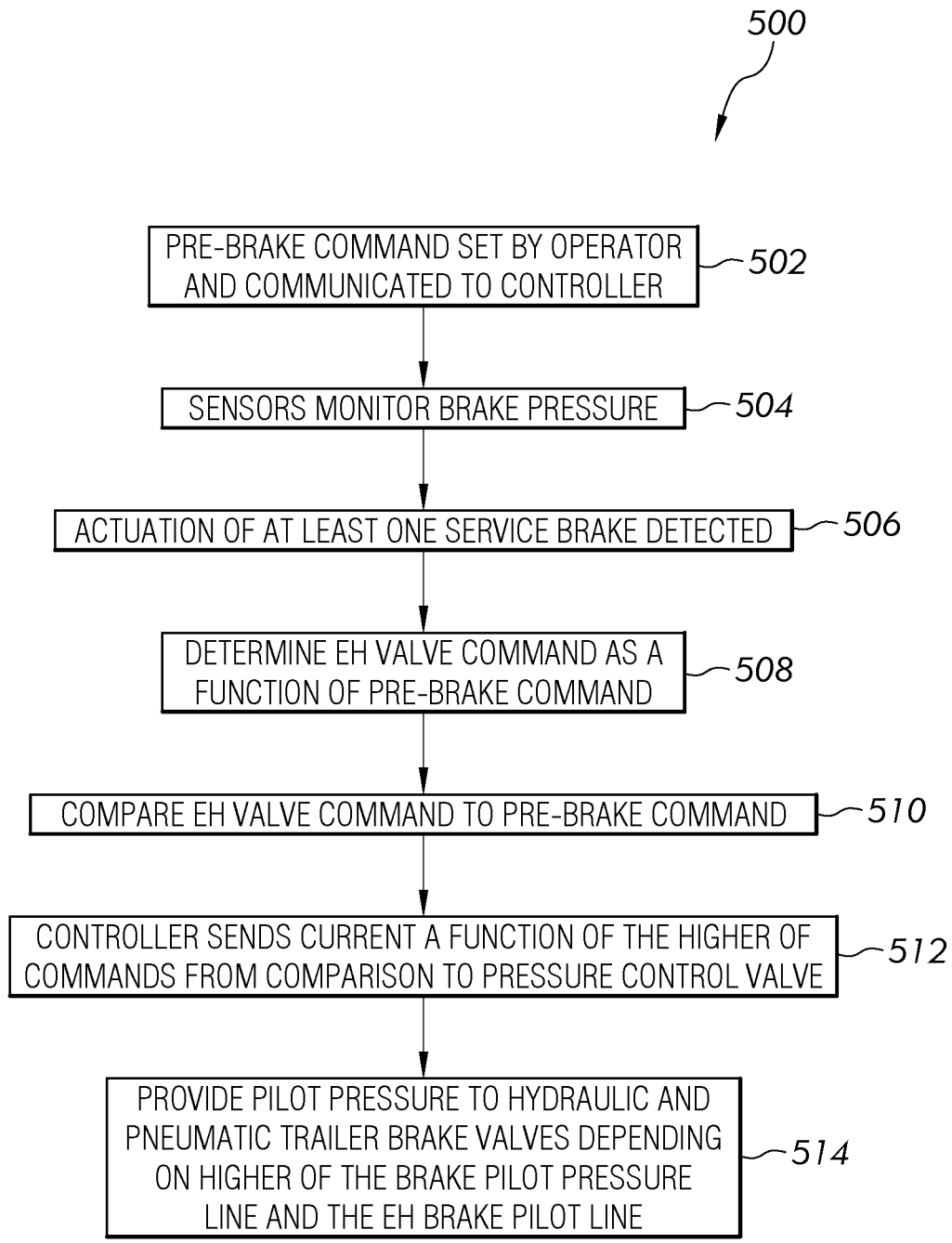
FIG. 5 is a flow diagram of a control process for controlling a combined tractor and trailer brake system.

As described above, the electrohydraulic valve set 220 may be adjustably controlled to adjust brake command to the hydraulic and pneumatic trailer brake valves. Here, an algorithm may be stored in and executed by the controller 202. The algorithm may also take the form of a control process 500 as illustrated in FIG. 5. The control process 500 may include a plurality of blocks or steps that may be executed in order to control the hydraulic and pneumatic brake circuits of the trailer. In one embodiment, the control process 500 may be executed by a processor of the brake controller 202, and an algorithm or software stored in a memory unit of the controller 202 may provide the necessary instructions for executing the process 500.

A first block 502, for example, may be executed by setting a pre-brake command. The pre-brake command may be a ratio that is greater than one (1). In this regard, hydraulic pressure from the hydraulic fluid supply 402 may be output via the electrohydraulic valve set 202 as a function of the ratio or pre-brake command. For instance, if the pre-brake command is set at 2.0, then 15 bar of incoming pressure may be output at 30 bar from the valve set 220. This is only intended to be a non-limiting example, as losses and the like may result in varying pressure outputs from the valve set 220.

In any event, the pre-brake command may be set in block 502 by the operator inputting a command value into a display 250 in the cab of the tractor or work machine. In doing so, the operator may continuously adjust the pre-brake command as desired. Alternatively, the brake controller 202 or other control unit may define this value.

Once block 502 is executed, the process 500 may advance to block 504 in which brake pressures are monitored by sensors. In FIG. 4, for example, a left brake pressure and a right brake pressure may be monitored by a pair of sensors or transducers 214, 216. These sensors or transducers 214, 216 are in electrical communication with the brake controller 202 so that in block 506, as at least one service brake is actuated by the operator, the sensors or transducers may communicate a detected pressure from either actuator 208, 210 to the controller 202.

As the controller 202 receives brake pressures from the transducers or sensors, it may execute block 508 by determining an electrohydraulic valve command as a function of the brake pressures and the pre-brake command. This may be achieved by taking an average of the left and right brake pressures in lines 406, 408 and multiplying the average by the pre-brake command. Alternatively, the controller 202 may select the maximum or minimum of the brake pressures and multiply that pressure by the pre-brake command. In a further embodiment, the controller 202 may be programmed to take a ratio of the pressures and multiply it by the pre-brake command. The manner in which the electrohydraulic valve command is determined in block 508 may be stored in the controller and executed in the form of an algorithm or routine. As such, the result of this block may be adjustably controlled by the operator by setting the pre-brake command to a desired value at any time in block 502.

Once the electrohydraulic valve command is determined in block 508, the controller 202 may compare the electrohydraulic valve command to the pre-brake command in block 510. Based on the comparison, the controller 202 may select the greater of the two values in block 512 and send a current to the control valve 410. The current may be proportional to the selected brake command. In block 512, the controller 202 may determine an amount of current that is a function of the detected brake pressures. The current may be proportional to the detected brake pressures. Alternatively, the current may be a factor or ratio of the detected pressures. A look-up table, formula, graphical data, or other known means may be used by the controller 202 to determine how much current to send to the control valve 410. Once the amount of current to send is determined in block 512, the brake controller 202 may communicate this current to the valve 418 and the output pressure from the electrohydraulic valve set 220 flows to the second shuttle valve 222, as described above.

In block 514, whichever pressure is greater between the pressure in the brake pilot pressure line 242 and the electrohydraulic brake pilot line 244 actuates the shuttle valve 222 and enter the pilot pressure line 312. Thus, the operator may adjustably control the pilot pressure to the hydraulic trailer brake valve 226 and the pneumatic trailer brake valve 302 in accordance with the control process 500.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A braking system of a trailer and work machine, comprising:
 a pressurized fluid supply;
 a hydraulic base valve fluidly coupled to the supply, the hydraulic base valve including an inlet and an outlet;
 a pneumatic base valve fluidly coupled to the supply, the pneumatic base valve including an inlet and an outlet;
 a proportional control valve fluidly coupled to the supply, the proportional control valve including an outlet disposed in fluid communication with the inlets of the hydraulic base valve and the pneumatic base valve;
 a hydraulic output configured to be fluidly coupled to a hydraulic braking system of a trailer, the hydraulic output fluidly coupled to the outlet of the hydraulic base valve; and
 a pneumatic output configured to be fluidly coupled to a pneumatic braking system of a trailer, the pneumatic output fluidly coupled to the outlet of the pneumatic base valve.

2. The braking system of claim 1, further comprising a solenoid valve disposed in fluid communication with the proportional control valve, where the solenoid valve is movable between an open position in which the proportional control valve is fluidly coupled to the hydraulic base valve and pneumatic base valve, and a closed position in which the proportional control valve is not fluidly coupled to the hydraulic base valve and pneumatic base valve.

3. The braking system of claim 1, further comprising:
 a controller; and
 a solenoid of the solenoid valve disposed in electrical communication with the controller, where movement of the solenoid valve between its open and closed positions is operably controlled by the controller.

4. The braking system of claim 1, further comprising:
 a controller;
 a service brake valve configured to provide fluid upon actuation of a service brake of the work machine;
 a sensor disposed in electrical communication with the controller, the sensor configured to detect a brake pressure from the service brake valve;
 wherein, the controller determines a brake command as a function of the brake pressure, and operably controls the proportional control valve based on the brake command.

5. The braking system of claim 4, wherein the controller receives a pre-brake command and operably controls an output of the proportional control valve as a function of the brake pressure and pre-brake command.

6. The braking system of claim 4, further comprising a shuttle valve movably actuated between a first position and a second position, the shuttle valve being fluidly coupled between the proportional control valve and the service brake valve;
 wherein, the shuttle valve is disposed in the first position when the brake pressure from the service brake valve is greater than an output pressure from the proportional control valve, and the shuttle valve is disposed in the second position when the brake pressure from the service brake valve is less than an output pressure from the proportional control valve.

7. The braking system of claim 6, wherein:
 in the first position, the service brake valve is directly fluidly coupled with the hydraulic and pneumatic base valves, and the shuttle valve blocks fluid communication between the proportional control valve and the hydraulic and pneumatic base valves; and
 in the second position, the proportional control valve is directly fluidly coupled with the hydraulic and pneumatic base valves, and the shuttle valve blocks fluid communication between the service brake valve and the hydraulic and pneumatic base valves.

8. A method of controlling pressurized fluid to a trailer brake system, comprising:
 providing a controller, a hydraulic fluid supply, a pneumatic fluid supply, a work machine brake system, a hydraulic brake output, a pneumatic brake output, a hydraulic base valve fluidly coupled to the hydraulic brake output, a pneumatic base valve fluidly coupled to the pneumatic brake output, a proportional control valve fluidly coupled to the hydraulic fluid supply, a solenoid valve, and a shuttle valve;

detecting a brake pressure in the work machine brake system with a sensor;

communicating the brake pressure to the controller via the sensor;

identifying, with the controller, a pre-brake command for the proportional control valve;

determining a brake command by the controller as a function of the brake pressure and the pre-brake command;

controlling an output pressure of the proportional control valve with the controller as a function of the brake command; and outputting pilot pressure to the hydraulic base valve and the pneumatic base valve based on the greater of the output pressure of the proportional control valve and the brake pressure of the work machine brake system.

9. The method of claim 8, further comprising:

providing a first brake and a second brake of the work machine brake system, the first brake generating a first brake pressure and the second brake generating a second brake pressure;

fluidly coupling a first sensor to the first brake for detecting the first brake pressure and a second sensor to the second brake for detecting the second brake pressure, wherein the first sensor and the second sensor are electrically coupled to the controller;

wherein, the determining step comprises calculating the brake command as a function of the first brake pressure, the second brake pressure, and the pre-brake command.

10. The method of claim 9, wherein the determining step comprises multiplying the pre-brake command by an average of the first and second brake pressures.

11. The method of claim 9, wherein the determining step comprises multiplying the pre-brake command by either the higher or lower of the first and second brake pressures.

12. The method of claim 9, wherein the controlling step comprises:

calculating the brake command as a function of the first brake pressure, the second brake pressure, and the pre-brake command;

comparing the brake command to the pre-brake command; and outputting a current to the proportional control valve based on the greater of the brake command and the pre-brake command.

13. The method of claim 8, wherein the outputting step comprises actuating the shuttle valve to a first position or a second position based on the greater of the output pressure of the proportional control valve and the brake pressure of the work machine brake system.

14. The method of claim 8, wherein the controlling step comprises:

determining an amount of current in proportion to the detected brake pressure; and sending the amount of current by the controller to the proportional control valve;

wherein, the amount of current is adjustable based on the pre-brake command.

15. The method of claim 8, further comprising adjustably controlling the pre-brake command for the proportional control valve.

16. The method of claim 8, further comprising:

fluidly coupling the solenoid valve between the proportional control valve and the shuttle valve;

electrically coupling a solenoid of the solenoid valve with the controller; and operably controlling movement of the solenoid valve between an open position and a closed position, wherein in the open position the output pressure of the proportional control valve is fluidly coupled to the shuttle valve, and in the closed position the output pressure of the proportional control valve is not fluidly coupled to the shuttle valve.

17. The method of claim 16, wherein in the closed position the service brake valve is directly fluidly coupled to the hydraulic base valve and the pneumatic base valve.

18. A braking system of a tractor trailer combination, comprising:

a controller;

a pressurized fluid supply;

a first brake and a second brake of the tractor, the first brake providing a first brake pressure and the second brake providing a second brake pressure;

a first shuttle valve disposed in fluid communication with the first brake pressure and the second brake pressure;

a hydraulic base valve fluidly coupled to the supply, the hydraulic base valve including an inlet and an outlet, where the inlet is fluidly coupled to the first shuttle valve;

a pneumatic base valve fluidly coupled to the supply, the pneumatic base valve including an inlet and an outlet, where the inlet of the pneumatic base valve is fluidly coupled to the inlet of the hydraulic base valve;

a proportional control valve fluidly coupled to the supply;

a second shuttle valve fluidly coupled between the proportional control valve and the first shuttle valve;

a hydraulic output fluidly coupled to the outlet of the hydraulic base valve and configured to be fluidly coupled to a hydraulic braking system of a trailer; and a pneumatic output fluidly coupled to the outlet of the pneumatic base valve and configured to be fluidly coupled to a pneumatic braking system of a trailer;

wherein, the controller operably controls an output pressure of the proportional control valve as a function of an adjustable brake command;

further wherein, a pilot pressure is fluidly communicated to the hydraulic base valve and the pneumatic base valve, where the pilot pressure is a function of the first brake pressure, the second brake pressure, and the output pressure.

19. The braking system of claim 18, further comprising a solenoid valve disposed in fluid communication between the proportional control valve and the second shuttle valve, where the solenoid valve is movable between an open position in which the proportional control valve is fluidly coupled to the second shuttle valve, and a closed position in which the proportional control valve is not fluidly coupled to the second shuttle valve.

20. The braking system of claim 19, further comprising an operator display for communicating a pre-brake command to the controller;

wherein, the brake command is determined by the controller as a function of the pre-brake command, the first brake pressure, and the second brake pressure;

further wherein, the output pressure of the proportional control valve is a function of current provided by the controller to the proportional control valve as a function of the brake command.

* * * * *